(12) United States Patent
Kim

(10) Patent No.: US 6,879,355 B1
(45) Date of Patent: Apr. 12, 2005

(54) BACK LIGHT UNIT IN LIQUID CRYSTAL DISPLAY

(75) Inventor: Je Hong Kim, Kyounggi-Do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 314 days.

(21) Appl. No.: 09/640,703

(22) Filed: Aug. 18, 2000

(30) Foreign Application Priority Data

Aug. 19, 1999 (KR) ...................................... P1999-34361

(51) Int. Cl.$^7$ ............................................. G02F 1/1335
(52) U.S. Cl. ............................. 349/65; 362/31; 362/26; 362/330; 349/62
(58) Field of Search ............................. 349/65, 70, 61, 349/57, 58, 62, 64, 95, 112; 362/31, 26, 330

(56) References Cited

U.S. PATENT DOCUMENTS

| | | | | |
|---|---|---|---|---|
| 5,339,179 A | * | 8/1994 | Rudisill et al. | 349/65 |
| 5,775,791 A | * | 7/1998 | Yoshikawa et al. | 362/31 |
| 5,816,677 A | * | 10/1998 | Kurematsu et al. | 362/31 |
| 5,844,720 A | * | 12/1998 | Ohara et al. | 359/599 |
| 5,899,552 A | * | 5/1999 | Yokoyama et al. | 362/31 |
| 5,961,197 A | * | 10/1999 | Watai et al. | 362/31 |
| 6,011,602 A | * | 1/2000 | Miyashita et al. | 349/65 |
| 6,104,454 A | * | 8/2000 | Hiyama et al. | 349/65 |
| 6,480,307 B1 | * | 11/2002 | Yang | 359/15 |

FOREIGN PATENT DOCUMENTS

KR 97-62759 9/1997

* cited by examiner

Primary Examiner—Tarifur R. Chowdhury
Assistant Examiner—Thoi V. Duong
(74) Attorney, Agent, or Firm—Birch, Stewart, Kolasch & Birch, LLP

(57) ABSTRACT

In a black light unit, a light-guide plate is provided with a cone pattern to uniformly guide a light beam passing through a light input. A light-path converter controls a progress direction of the light beam in such a manner that the light beam outputted from the light-guide plate is progressed in a direction perpendicular to a liquid crystal panel. A diffusion sheet diffuses the light beam passing through the light-path converter into the liquid crystal panel. A reflection of the light-guide pattern and wall surface and the bright lines of the light input can be minimized. The light efficiency can be improved and the manufacturing cost can be reduced.

20 Claims, 4 Drawing Sheets

BACK LIGHT UNIT IN LIQUID CRYSTAL DISPLAY

BACKGROUND OF THE INVENTION

1. The Field of the Invention

This invention relates to a liquid crystal display, and more particularly to a back light unit in the liquid crystal display that minimizes a reflection of the pattern on a wall surface of a light-guide plate and bright lines from a light input.

2. Description of the Related Arts

Generally, a liquid crystal display (LCD) controls an amount of light transmitted from a back light unit. The transmission is controlled by means of a liquid crystal panel including a number of liquid crystal cells arranged in a matrix and a number of control switches for switching video signals to be applied to the liquid crystal cells, thereby displaying a desired picture on a screen. Conventional back light units will be described with reference to FIG. 1 and FIG. 2.

Referring to FIG. 1, the first conventional back light unit includes a light-guide plate 4 for guiding light passing through a light input 20; a reflective plate 2 disposed under the light-guide plate 4 for reflecting light escaping from a lower and side surfaces of the light-guide 4 in an upper direction toward an upper surface of the light guide 4; a first diffusion sheet 6 for diffusing light passing through the light-guide plate 4; first and second prism sheets 8 and 10 for controlling the direction of light passing through the first diffusion sheet 6; and a second diffusion sheet 12 for diffusing light passing through the prism sheets 8 and 10.

The light input 20 includes a lamp 22 for generating light, and a lamp housing 24 for housing the lamp 22. The lamp housing also reflects the tight into the light-guide plate 4. A printed pattern is provided on the lower surface of the light-guide plate 4. This printed pattern does not allow the light-guide plate 4 to exhibit total internal reflection, which would allow light to be uniformly distributed out of the upper surface of the light-guide plate 4.

As mentioned above, the light escaping from the lower surface and the side surface of the light-guide plate 4 are redirected by the reflective plate 2. The light passing through the light-guide plate 4 are diffused into an entire surface area of a liquid crystal panel (not shown) by the first diffusion sheet 6.

The light entering the liquid crystal panel at right angles has a large light efficiency. Thus, it is preferred that the light enter the liquid crystal panel perpendicular to the surface of the liquid crystal panel. Towards this end, two forward prism sheets are disposed to make the angle of the light exiting from the light-guide plate 4 perpendicular to the liquid crystal panel. Referring to FIG. 1, the light passing through the first and second prism sheets 8 and 10 is incident to the liquid crystal panel via the second diffusion sheet 12.

The first conventional back light unit cannot obtain a desired visual angle profile until the two prism sheets are included. The extra prism and the diffusion sheets absorb more light and thus cause an increased loss of light being transmitted to the liquid crystal panel. Also, the manufacturing cost rises.

A suggested structure to solve the above-mentioned problems is shown in FIG. 2. The second conventional back light unit includes a light-guide plate 4' for guiding light passing through a light input 20; a reflective plate 2 disposed under the light-guide plate 4' for reflecting light escaping from a lower and side surfaces of the light-guide 4' in an upper direction toward an upper surface of the light guide 4'; a backward prism sheet 14 for controlling the direction of light passing through the light-guide plate 4'; and a diffusion sheet 12 for diffusing light passing through the prism sheet 14.

The light input 20 and the reflective plate 2 have the same function and operation as those in FIG. 1.

A prism-shaped pattern is provided on the lower surface of the light-guide plate 4'. This prism-shaped pattern does not allow the light-guide plate 4' to exhibit total internal reflection, which would allow the light to be uniformly distributed out of the upper surface of the light-guide plate 4'.

In this case, it is desirable that, since the angle of the light outputted from the light-guide plate 4' is more than about 65°, vertical angles of the prism sheet 14 should be between 63° to 70°. Thus, the light passing through the prism sheet 14 make right angles with respect to the surface of the liquid crystal panel. The light passing through the prism sheets 14 are diffused into the entire surface area of the liquid crystal panel by the diffusion sheet 12.

In the second conventional back light unit, the wall surface of the light-guide plate 4' are reflected and the bright lines of the light input 20 are seen due to the backward prism sheet 14. To solve the problems of the conventional art, a new scheme is needed to reduce the manufacturing cost as well as minimize the wall surface reflection and the bright lines of the light input.

SUMMARY OF THE INVENTION

Accordingly, it is an object of the present invention to provide a back light unit in a liquid crystal display that minimizes a resection of the pattern and wall surface of a light-guide plate as well to reduce bright lines of a light input.

To achieve these and other objects of the invention, a back light unit in a liquid crystal display according to an aspect of the present invention includes a light-guide plate including a pattern of cones to uniformly guide a light passing through a light input; a light-path converter to direct the light such that the light exiting from the light-guide plate is enters a liquid crystal panel perpendicularly to a surface of the liquid crystal panel; and a diffusion sheet for diffusing the light passing through the light-path converter into the liquid crystal panel.

Advantages of the present invention will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention will be apparent from the following detailed description of the embodiments of the present invention with reference to the accompanying drawings, in which.

DETAILED DESCRIPTION OF THE PREFERRED EMBODIMENT

Figure 1:
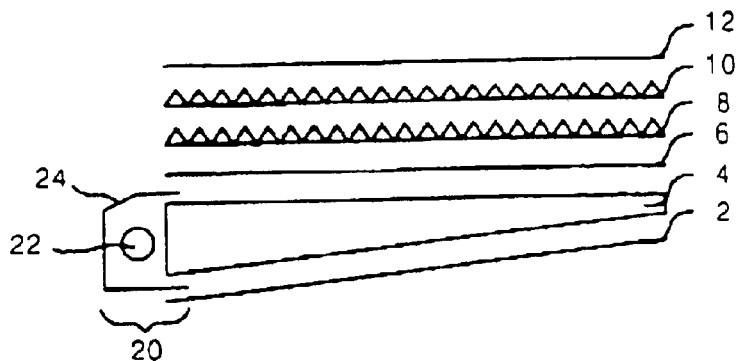
FIG. 1 is a sectional view showing the configuration of the first conventional back light unit.
Figure 2:
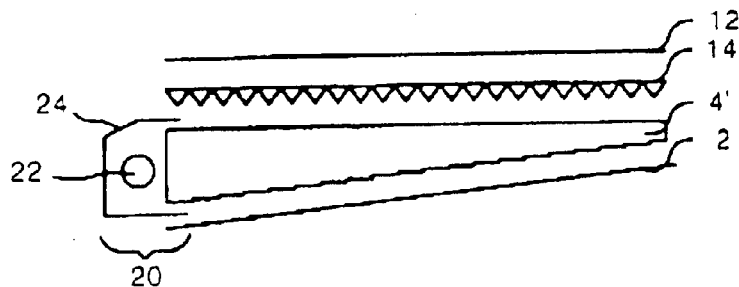
FIG. 2 is a section view showing the configuration of the second conventional back light unit.
Figure 3:
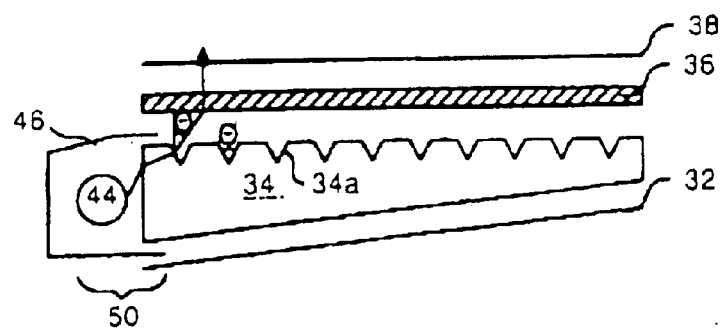
FIG. 3 is a section view showing the configuration of a back light unit according to an embodiment of the present invention.

A back light unit according to an embodiment of the present invention is shown in FIG. 3. The back light unit includes a light-guide plate 34 including a cone pattern 34a. The cone pattern 34a uniformly distributes light from a light input 50. The cone pattern 34a can be distributed either on an upper surface or a lower surface of the light-guide plate 34.

A reflective plate 32, disposed under the light-guide plate 34, reflects light from the light input 50 in an upward direction. A light-path converter 36 controls the light such that it enters perpendicularly to a surface of a liquid crystal display panel (not shown). Finally, a diffusion sheet 38 diffuses the light passing through the light-path converter 36.

Figure 4A:
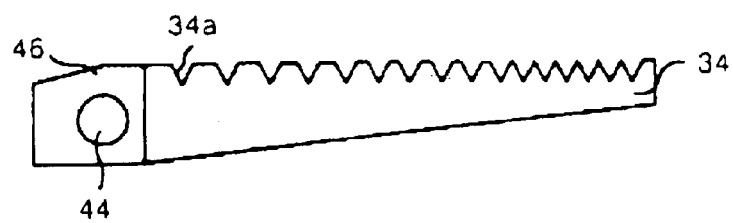
FIGS. 4A and 4B are views for explaining the relationship of the density of the cone patterns on the light-guide to the distance from the light input of the back light unit in FIG. 3.
Figure 4B:
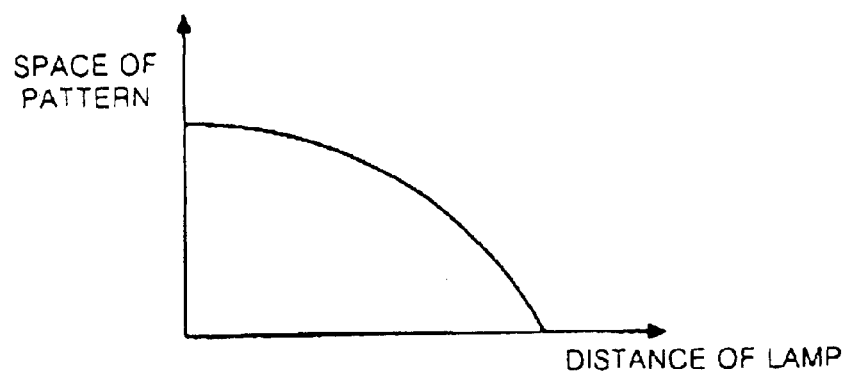

FIGS. 4A and 4B explain the relationship of the density of cones in the cone pattern 34a to a distribution of light. On the light-guide plate 34, as the distance from the light source increases, the density of the concs of the cone pattern 34a increases. Stated another way, spacing between cones decreases as the distance from the lamp input 50 increases. Such spacing allows the light exiting the light-guide plate 34 to be uniformly distributed, which is desirable.

Figure 5:
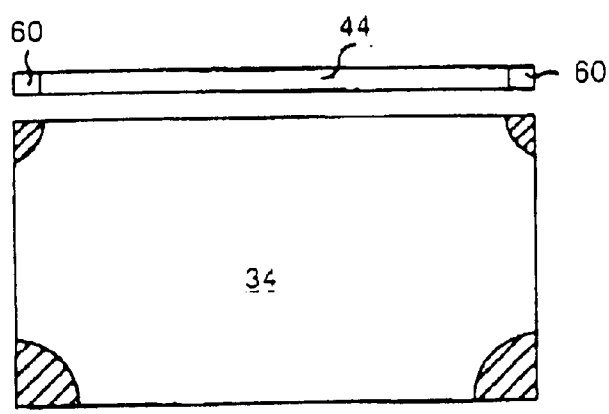
FIG. 5 is a view for explaining the cone pattern density at specific areas of the light-guide plate in the back light unit in FIG. 3.

The spacing of the cones can be modified to solve another problem. FIG. 5 is a view showing a surface of the light-guide plate 34 and the lamp 44. As shown, it is seen that the lamp 44 includes rubber packing 60. The rubber packing 60 allows the lamp 44 to be secured within the lamp housing 46. Unfortunately, the rubber packing 60 also screens parts of the lamp 44 resulting in partially dark areas of the light-guide plate 34. By more densely packing the cones in these areas, the overall uniformity of light being transmitted to the liquid crystal panel is enhanced.

Figure 6:
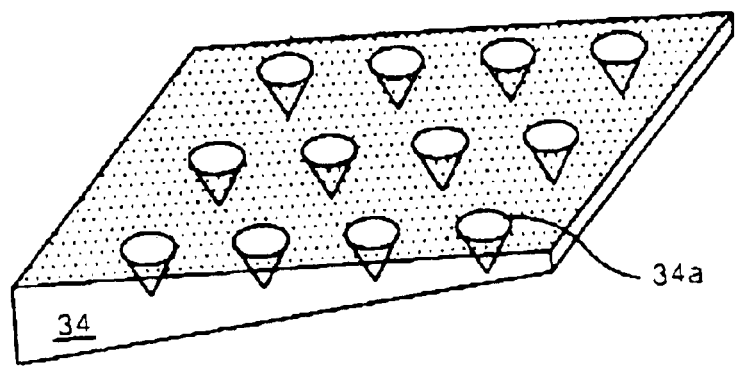
FIG. 6 is a detailed perspective view of the light-guide plate in FIG. 3.

The cones of the cone pattern 34a as shown in FIG. 6 have a diameter of about 100 to about 500 μm and a height of about 50 to about 900 μm. The height of the cones depends on a vertical angle θ' of each cone (see FIG. 3). The vertical θ' ranges from about 30° to about 1200. The output angle θ of a light exiting from the light-guide plate 34 can be raised to a maximum of about 350 by a combination of the light-guide plate 34 provided with the cone pattern 34a, the light input 50 and the reflective plate 32.

Figure 7:
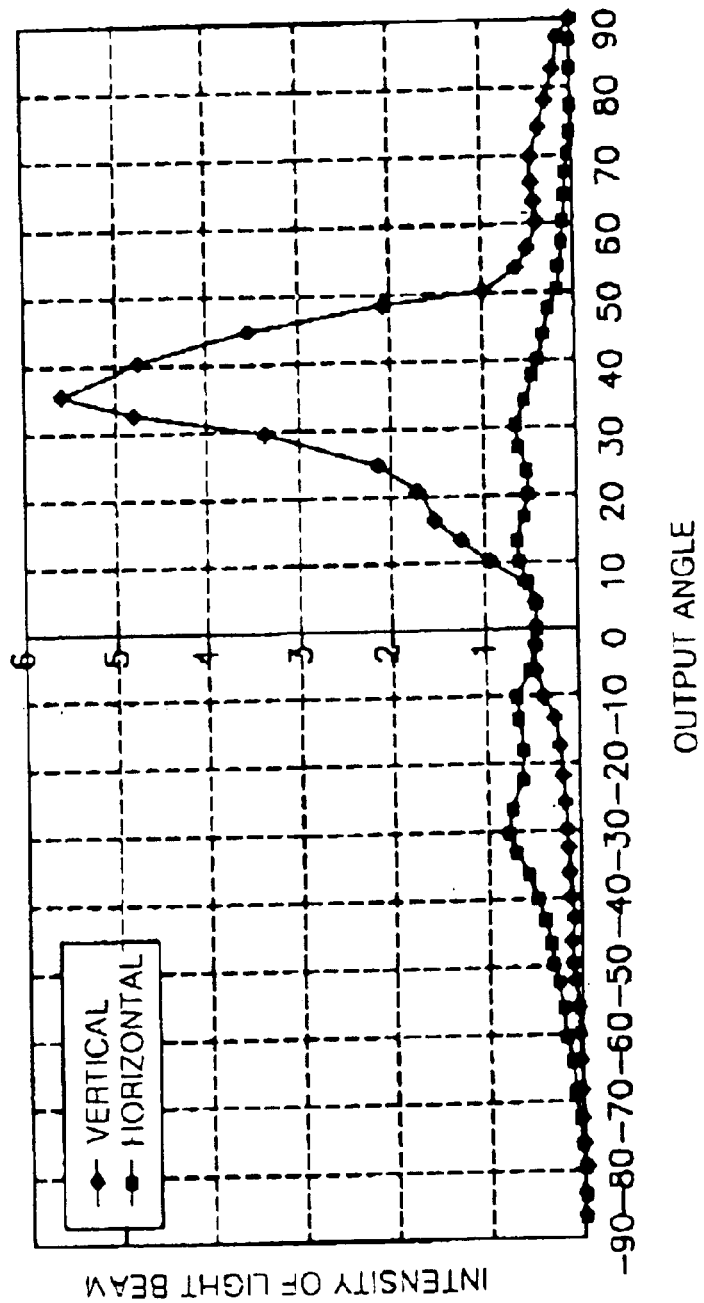
FIG. 7 is a graph illustrating a distribution of intensity from light exiting from the light-guide plate in FIG. 3.

FIG. 7 illustrates distribution graph of light intensity to the output angle θ of a light exiting from the light-guide plate 34 when the vertical angle θ' of the cones in the cone pattern 34a is 45° and the diameter is 500 μm. It is seen that intensity reaches a maximum value when the output angle θ is 35°. The output angle at which the intensity reaches maximum can be manipulated by adjusting the vertical angle θ' of the cones.

A light path converter 36 is placed above the light-guide plate 34 to direct the light to escape from the light-guide plate 34 perpendicularly to the surface of the liquid crystal display panel. In other words, the output angle θ of the light exiting from the light-guide plate 34 is converted.

Figure 8A:
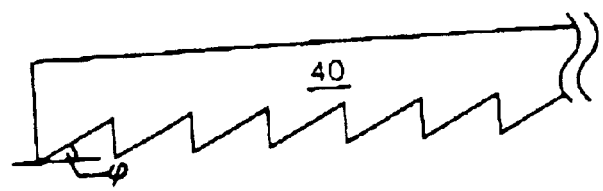
FIGS. 8A and 8B are section views showing alternative examples of the light path converter in FIG. 3.
Figure 8B:
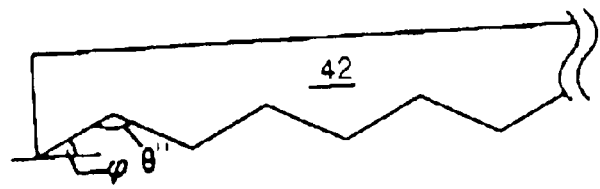

A forward prism having a vertical angle θ" ranging from about 90° to about 130° may be used as the light-path converter. Alternatively, one of prism sheets 40 and 42 as shown in FIGS. 8A and 8B can be used as the light-path converter 36. Prism sheets 40 and 42 have an angle φ, called the between angle, arranged in a backward direction.

Wherein the between angle φ of the prism sheet 40 and 42 should be within 45°. Vertical angles θ" of the prism sheet 40 and 42 can require optical angles of more than about 90°. Specially, the vertical angles θ" of the prism sheet 40 and 42 prefers to have optical angles of above about 100°. With to such optical angles, the bright lines of the lamp and the wall surface reflection phenomenon can be considerably reduced or eliminated, when compared to using a prism sheet having a relatively acute optical angle from about 60° to about 70°.

Further, a hologram sheet may be used as the light-path converter 36. The hologram sheet converts light exiting from the light-guide plate 34 to be perpendicular to the liquid crystal panel without any dispersion. A pattern provided on the hologram sheer as well as the shape of the hologram sheet convert the direction of the light exiting from the light-guide plate 34. The pattern and the shape can be manipulated to adjust for particular conditions.

Above prism sheet 40 or 42 (representing a light-path converter 36), the diffusion sheet 38 diffuses the light from the light-path converter 36 to the entire surface of the liquid crystal panel.

As described above, according to the present invention, only one light-path converter and only one diffusion sheet are needed. Also, a reflection of the in light-guide pattern and wall surface as well as the bright lines of the light input are minimized. In addition, different types of sheets can be used as the light-path converter to improve the light efficiency as well as to reduce the manufacturing cost.

Although the present invention has been explained by the embodiments is shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A back light unit in a liquid crystal display including a lamp generating a light, and a light input having a lamp housing for housing the lamp secured therein by packing and for reflecting the light, said unit comprising:

a light-guide plate including a cone pattern to uniformly guide the light from the light input;

a light-path converter to control a progress direction of the light in such a manner that the light outputted from the light-guide plate is progressed in a direction perpendicular to a liquid crystal panel; and a diffusion sheet for diffusing the light passing through the light-path converter into the liquid crystal panel, wherein the cone pattern is formed on an upper surface of the light-guide plate, a density of cones increases as a distance from said lamp increases, and the cones are more densely packed in partially dark areas in the light-guide plate caused by the packing.

2. The back light unit according to claim 1, wherein a vertical angle of a cone of the cone pattern ranges from about 30° to about 120°.

3. The back light unit according to claim 1, wherein a diameter of a cone of the cone pattern ranges from about 100 to about 500 μm and a height ranges from about 50 to about 900 μm.

4. The back light unit according to claim 1, wherein spacings of cones of the cone pattern is controlled to correspond to a distribution of the light.

5. The back light unit according to claim 1, wherein the light converter is a forward prism sheet having a vertical angle ranging from about 90° to about 130°.

6. The back light unit according to claim 1, wherein the light converter is a backward prism sheet having a desired between angle.

7. The back light unit according to claim 6, wherein a vertical angle of the backward prism is above about 100°.

8. The back light unit according to claim 1, wherein the light-path converter is a hologram sheet.

9. The back light unit according to claim 8 wherein a space and a shape of the hologram pattern are controlled to correspond to an output angle of the light progressing into the liquid crystal panel.

10. The back light unit according to claim 1, wherein an output angle θ of light exiting from the light-guide plate is about 35°.

11. A back light unit for a liquid crystal display, comprising:

a lamp secured in a lamp housing by packing;

a light-guide plate aside said lamp and said lamp housing, said light-guide plate including cones distributed in a pattern for guiding uniformly light from the lamp, the packing resulting in partially dark areas in the light-guide plate;

a reflective plate placed below said light-guide plate; and a diffusion sheet disposed above said light-guide plate, wherein said cones are formed on an upper surface of said light-guide plate, and a density of cones increases as a distance from said lamp increases, and the cones are more densely packed in the partially dark areas.

12. The back light unit of claim 11, further comprising:

a light-path converter placed above said light-guide plate.

13. The back light unit of claim 12, wherein said light-path, converter is one of a forward prism sheet, a backward prism sheet, and a hologram sheet.

14. The back light unit of claim 13, wherein said forward prism sheet has a prism with vertical angle ranging from about 90° to about 130°.

15. The back light unit of claim 13, wherein said backward prism sheet has a prism with a between angle of within 45°.

16. The back light unit of claim 13, wherein said backward prism sheet has a prism with a vertical angle of above about 100°.

17. The back light unit of claim 13, wherein said hologram sheet has a pattern and a shape that are controlled to correspond to an output angle of light exiting from said light-guide plate.

18. The back light unit of claim 11, wherein a density of said cones are such that said light exiting from said light-guide plate is uniformly distributed.

19. The back light unit of claim 18, wherein said cones are more densely populated around partially dark areas of said light-guide plate.

20. The back light unit of claim 11, wherein an output angle θ of light exiting from the light-guide plate is about 35°.

\* \* \* \* \*